Jan. 5, 1937.  C. A. TRIPP  2,066,750
CARD TABULATING MACHINE
Filed March 28, 1931  7 Sheets—Sheet 1
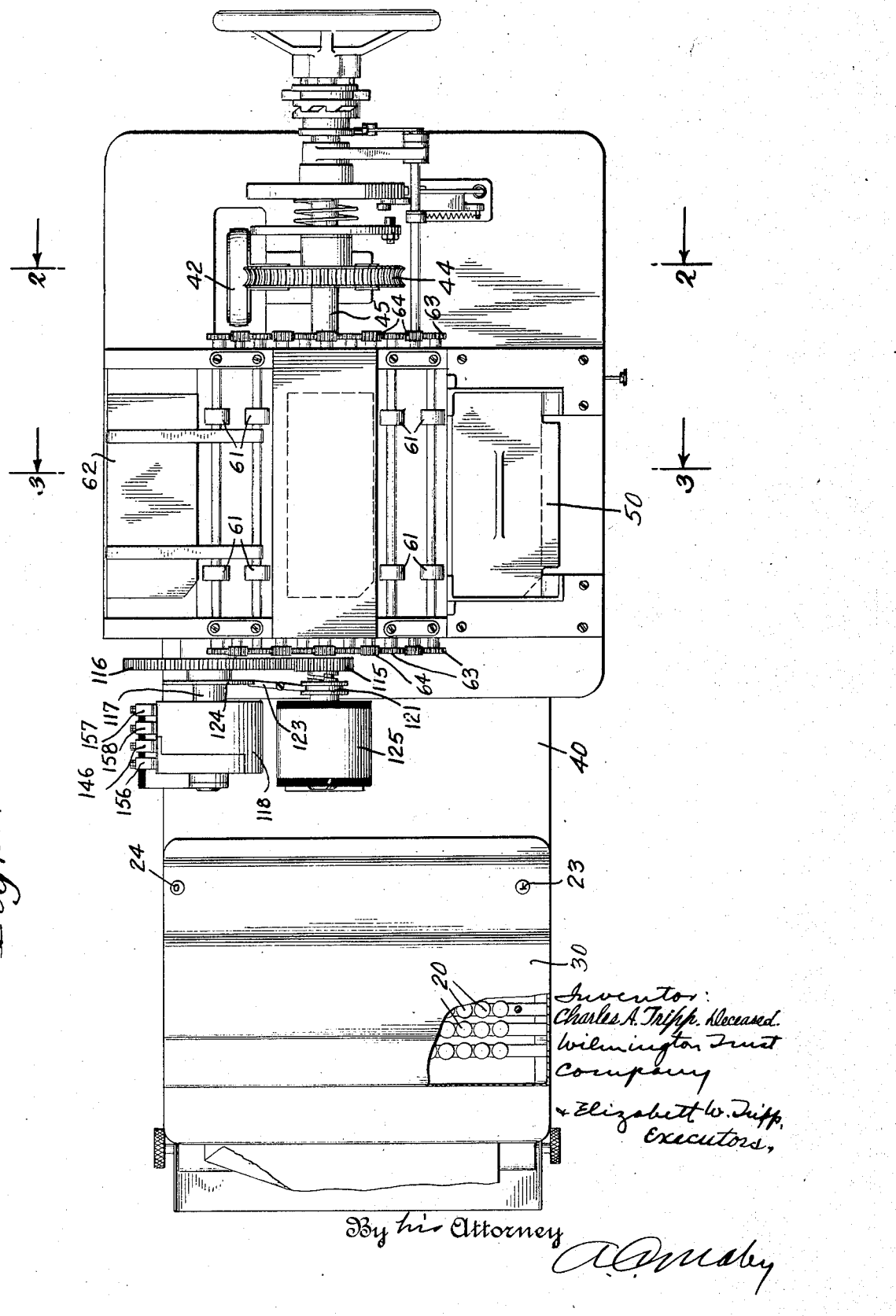

Jan. 5, 1937.  C. A. TRIPP  2,066,750
CARD TABULATING MACHINE
Filed March 28, 1931   7 Sheets-Sheet 2
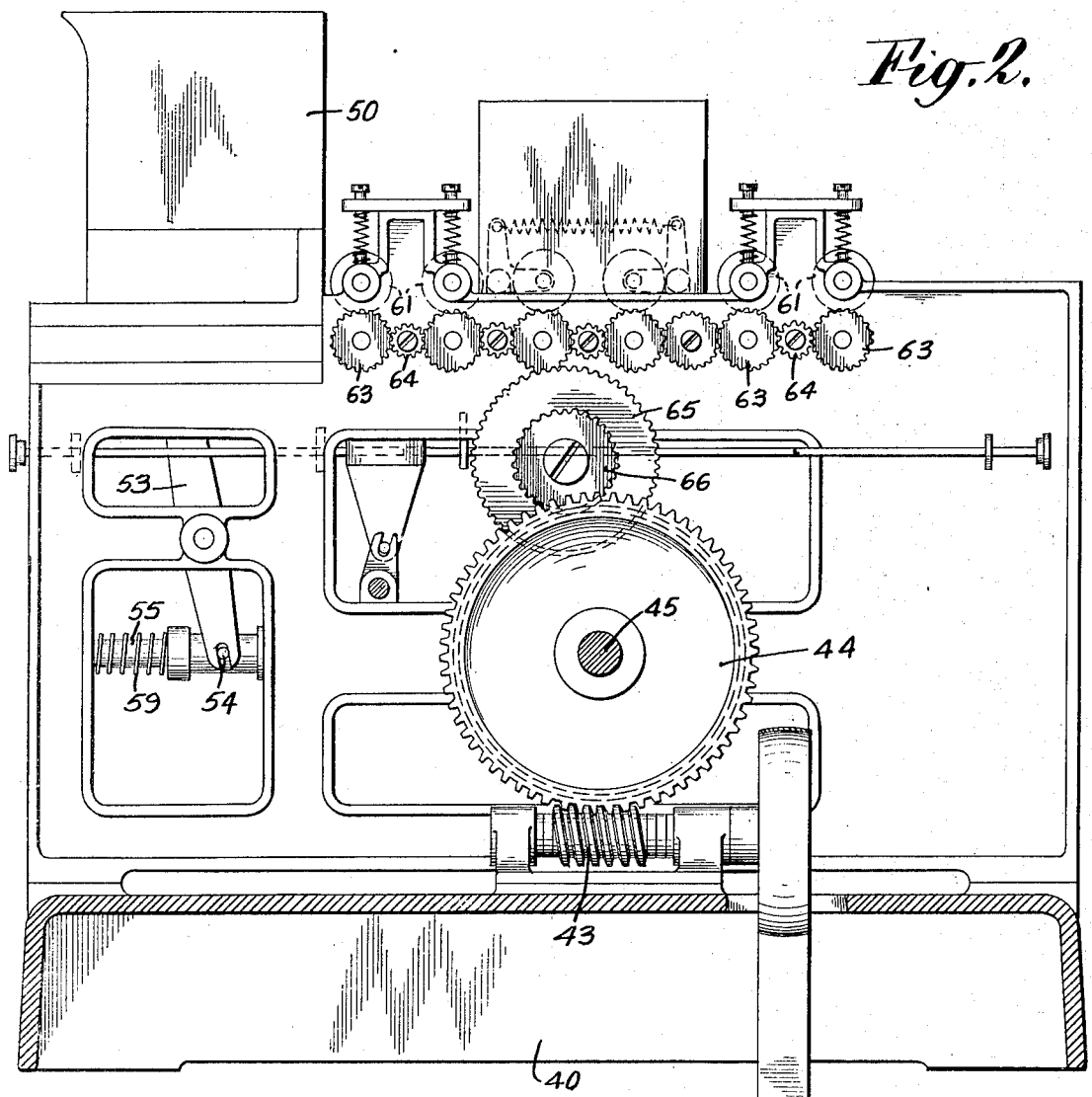
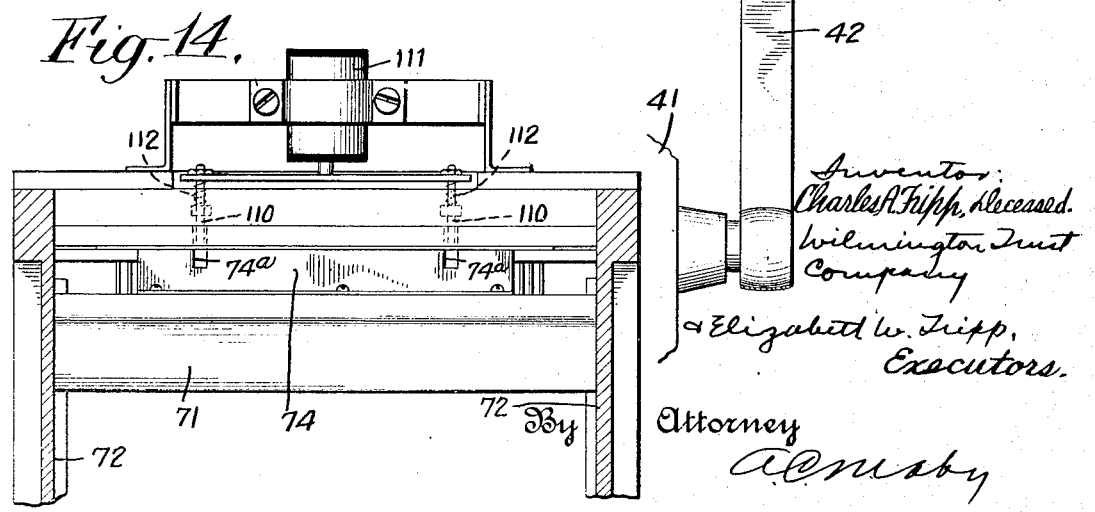

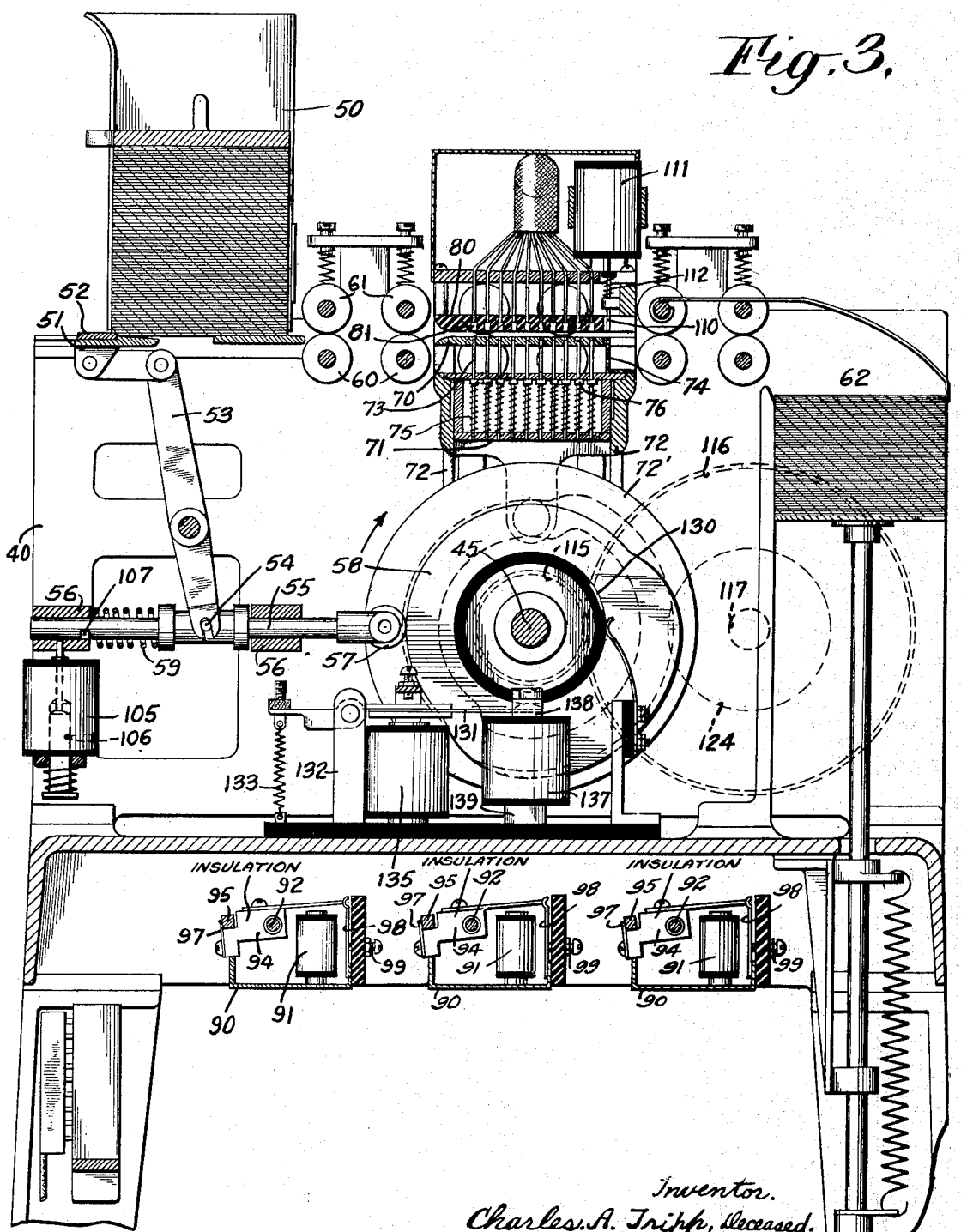

Jan. 5, 1937.  C. A. TRIPP  2,066,750
CARD TABULATING MACHINE
Filed March 28, 1931   7 Sheets-Sheet 4

Inventor:
Charles A. Tripp, deceased,
Wilmington Trust
Company
& Elizabeth W. Tripp, Executors By  Attorney Jan. 5, 1937.  C. A. TRIPP  2,066,750
CARD TABULATING MACHINE
Filed March 28, 1931  7 Sheets-Sheet 5

Inventor,
Charles A. Tripp, Deceased.
Wilmington Trust Company
& Elizabeth W. Tripp, Executors
By  Attorney Jan. 5, 1937.  C. A. TRIPP  2,066,750
CARD TABULATING MACHINE
Filed March 28, 1931   7 Sheets-Sheet 6
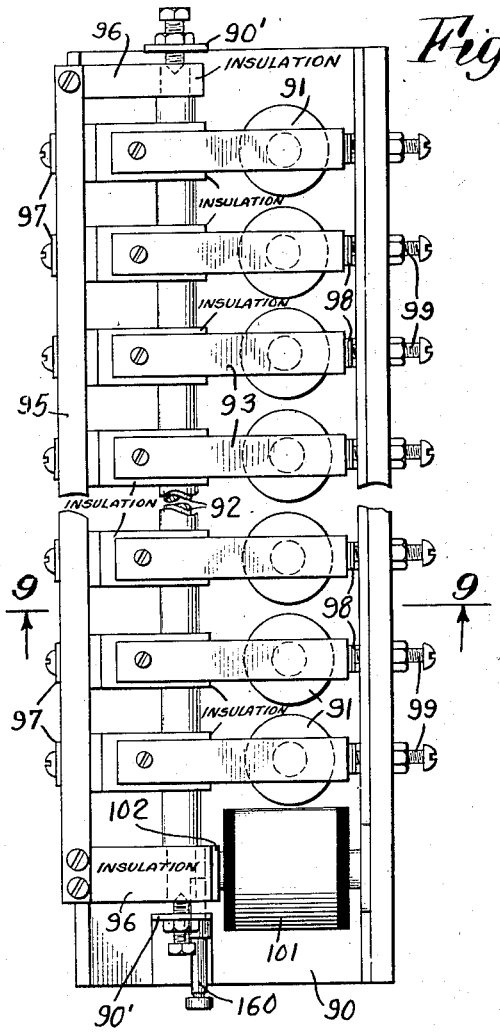
Fig. 8.
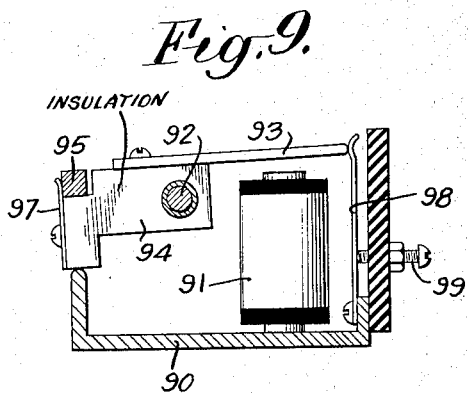
Fig. 9.
Fig. 10.
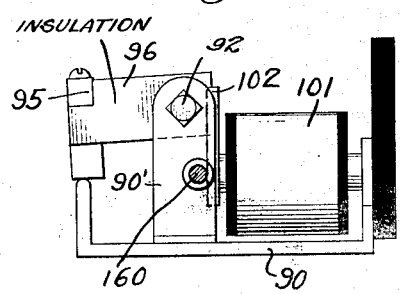
Fig. 11.
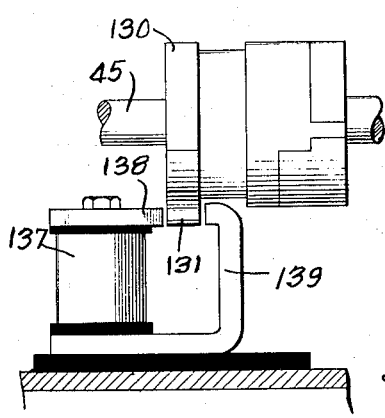
Fig. 12.
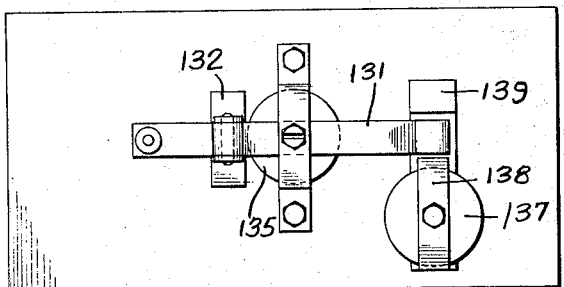
Charles A. Tripp, Deceased.
Wilmington Trust Company
& Elizabeth W. Tripp, Executors
By  Attorney Patented Jan. 5, 1937

2,066,750

UNITED STATES PATENT OFFICE 2,066,750

CARD TABULATING MACHINE

Charles A. Tripp, deceased, late of Wilmington, Del., by Wilmington Trust Company and Elizabeth W. Tripp, executors, Wilmington, Del., assignors, by mesne assignments, to International Business Machines Corporation, New York, N. Y., a corporation of New York Application March 28, 1931, Serial No. 526,096

1 Claim. (Cl. 235—92)

This invention is concerned with punched card accounting machines of the type in which punched cards containing group-designating holes and item-designating holes are, after having been sorted into groups, successively presented to the machine which records the individual items and takes a total thereof after each group. A machine somewhat similar to the one with which the present invention is concerned is shown and described in co-pending patent application Serial No. 526,095, filed March 28, 1931, now Patent 1,978,919, issued October 30, 1934.

The present invention differs from that of the prior application above mentioned in that the construction of the machine and the arrangement of the electrical circuits which control the operation thereof are considerably simplified by the invention described in this application. Further, in the present invention, an accounting mechanism is utilized having two sets of accumulators, which enables taking individual totals of the items of each group of cards and, at the end of a run of cards consisting of several groups, to take a grand total of the items represented by cards of such groups. The type of adding machine shown in the present application is known as the Burroughs type and is shown in United States Patent 919,656.

Figure 4:
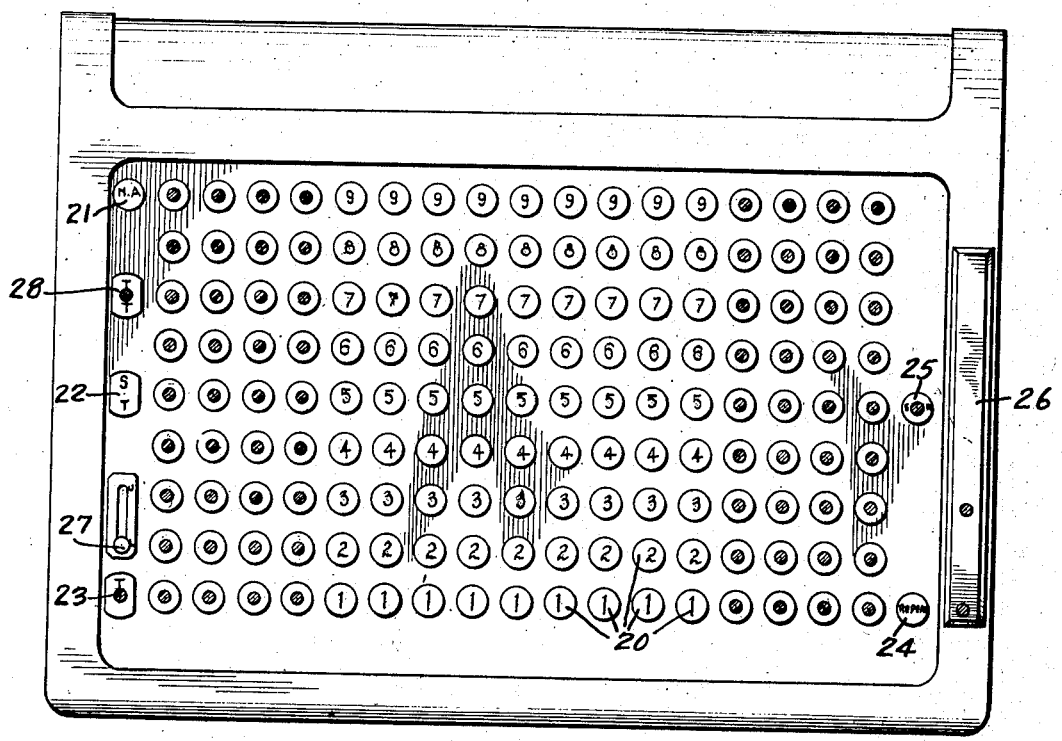
Figure 5:
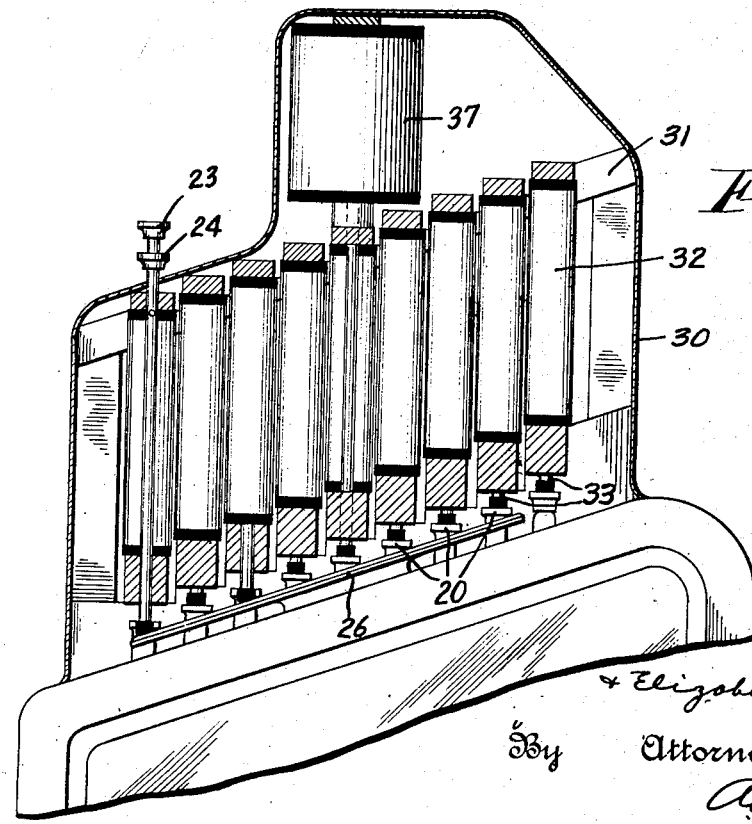
Figure 6:
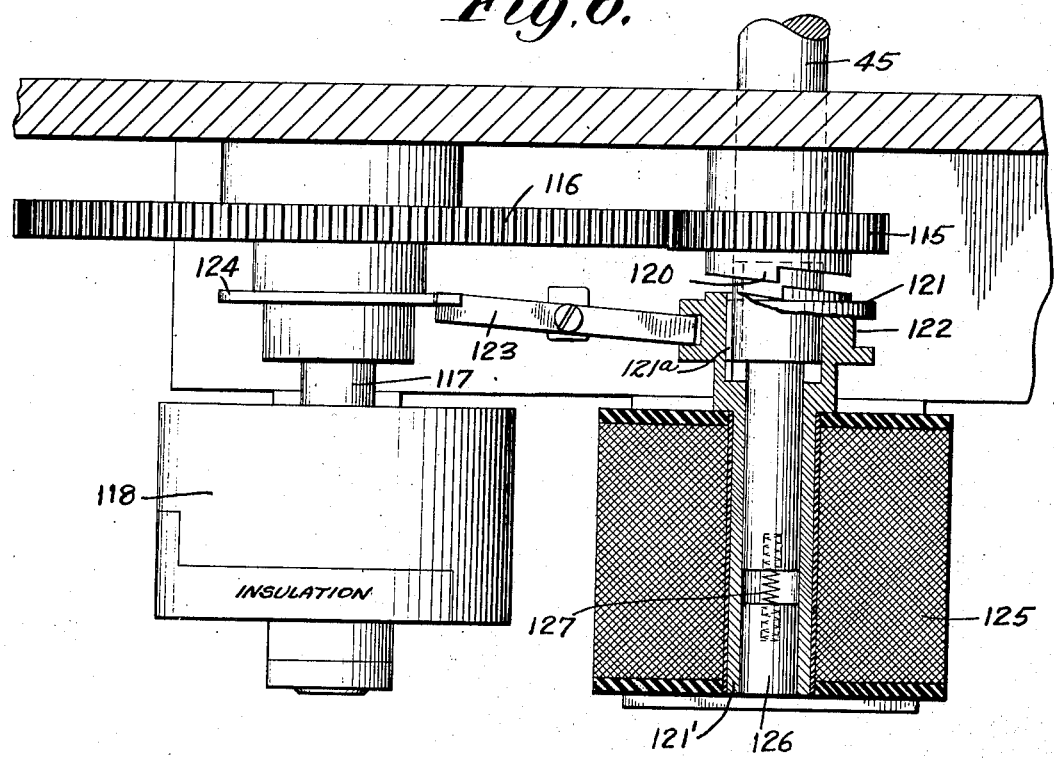
Figure 7:
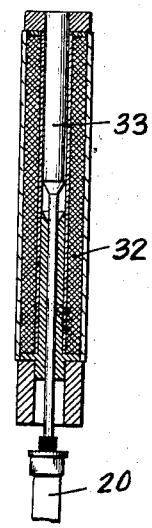
Figure 13:
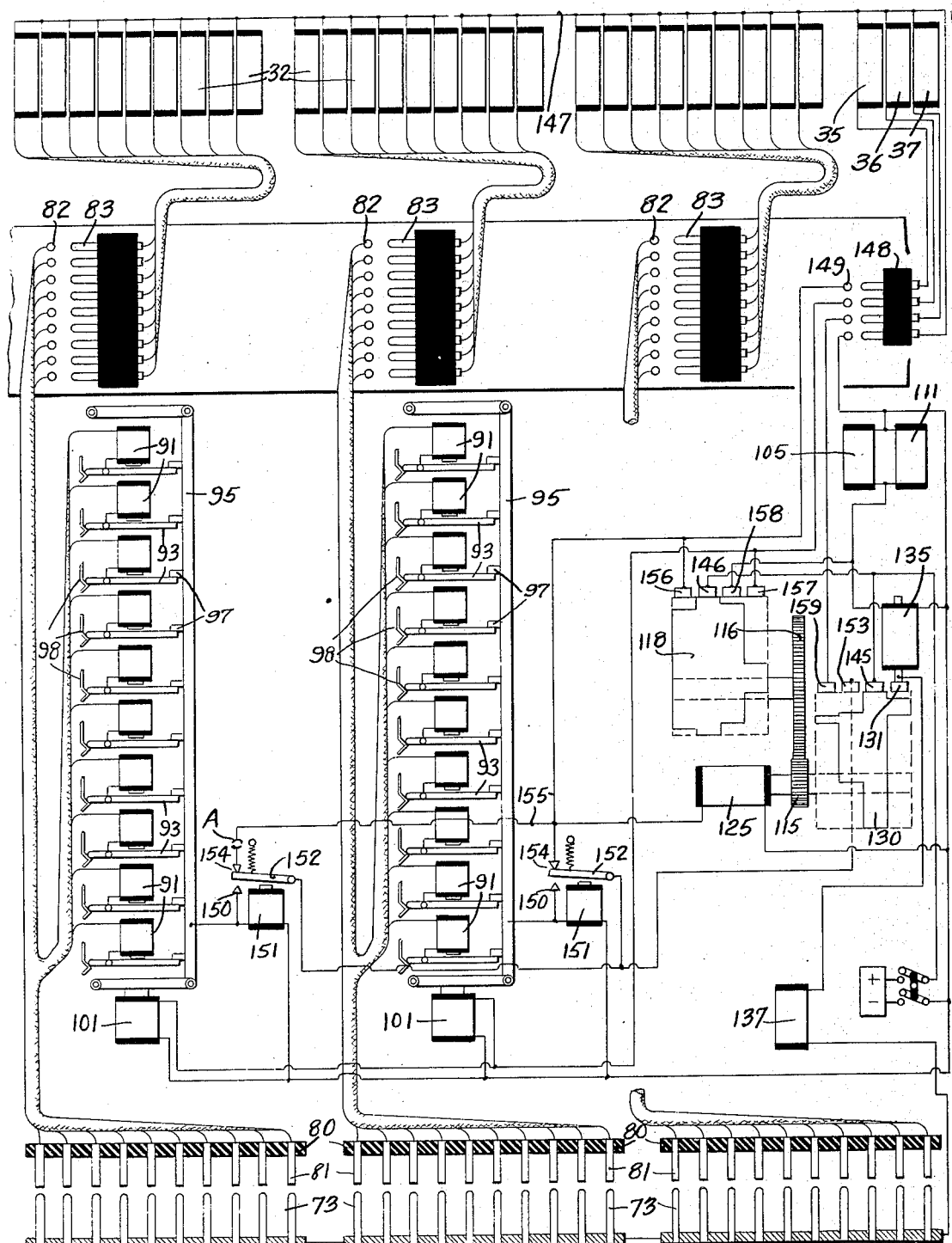

The accompanying drawings illustrate the invention: Fig. 1 is a plan view of the machine illustrating the preferred arrangement of the various parts; Figs. 2 and 3 are vertical sections respectively on the correspondingly numbered section-lines of Fig. 1; Fig. 4 is a plan view of the adding machine keyboard with the heads of some of the keys removed; Fig. 5 is a vertical section through the housing which contains the key-actuating magnets; Fig. 6 is a plan view in partial section illustrating details of the construction of the clutch which actuates the totaling commutator; Fig. 7 is a longitudinal section through one of the key-actuating magnets; Fig. 8 is a plan view of one of the selector units; Fig. 9 is a vertical section on the line 9—9 of Fig. 8; Fig. 10 is an end elevation of the selector unit illustrated in Fig. 8; Fig. 11 is a fragmental elevation illustrating the arrangement of the blow-out magnet; Fig. 12 is a plan showing the pin switch and blow-out magnet; Fig. 13 is a diagrammatic showing of the electrical circuits; and Fig. 14 is a view illustrating an elevation of the card-stopping mechanism.

The adding machine which is embodied in the invention may be of any desired make, but it is illustrated and described as embodying a machine of the well-known Burroughs type. This machine has a keyboard containing columns of amount keys 20, there being in each column nine keys corresponding respectively to the nine digits. The number of columns may be anything desired. In addition to the amount-keys, there are present on the keyboard the regular "non-add" key 21, the sub-total key 22, the total key 23, the repeat key 24, the error key 25, and the actuating or handle key 26. The invention is not concerned with the "non-add" key or the repeat key or their respective functions.

The adding machine illustrated in the drawings is of the type employing two sets of adder or accumulator wheels, known respectively as the upper and lower accumulators. In addition to the control keys described above, the keyboard includes an accumulator lever 27 which may be operated to bring either set of the accumulator wheels into co-operation with the swinging sectors. The keyboard also has a total-transfer key 28, by means of which is effected the clearing of one set of accumulator wheels and the transfer of the total therein to the other set of accumulator wheels.

In the normal operation of this adding machine, the amount keys are successively set to correspond to the respective items which are to be added, and between each setting of the amount keys, the handle key 26 is depressed to effect the recording of the item and the adding of the amount into one set of accumulator wheels. After the last item is recorded, the handle key 26 is depressed to produce a spacing of the adding machine tape and to return to the zero position any of the sectors of the adding machine which have "carried" during the last item-recording cycle.

One set of accumulator wheels commonly designated as the "upper" accumulators, now contains the total of all the items which have been recorded and it is assumed that the other set of accumulator wheels will still contain the total "lower" accumulator, is clear.

If it is desired to have the machine record a total without clearing, the total key 22 is held down and the handle key 26 is depressed. This operation will effect the recording of the total; and at the completion of the cycle, the upper accumulator wheels will still contain the total recorded.

If it is desired to record the total, to clear the accumulators containing such total, but to preserve the total in the machine on the other set of accumulators, the total-transfer key 28 is held down and the handle key 26 is depressed. During the cycle so instituted, the total in the upper accumulators will be printed and transferred to the lower accumulators. Upon the resumption of item-recording, the successive amounts are successively added into the upper accumulators and the total in the lower accumulators remains undisturbed. This method of operating the machine is employed when it is desired to record groups of items, to show the total of each group, and at the completion of recording to show the grand total of all the groups.

Either set of accumulators may be cleared by operating the lever 27 to bring such accumulators into co-operation with the adding machine sectors, by holding down the total key 23, and then depressing the handle key 26.

To operate the various keys of the adding machine, there is mounted over the keyboard a casing 30 within which, on a suitable frame 31, are mounted a plurality of amount-key setting magnets 32 in the form of solenoids having armatures 33 which co-operate with the amount-keys 20 and are drawn downward when the magnets 32 are energized. Co-operating with the error key, the total-transfer key, and the handle key 26 are similarly arranged magnets, 35, 36, and 37 which when energized effect respectively the depression of such keys. The circuits of these various magnets are controlled in accordance with the location of holes in the punched cards which are supplied to the machine.

The card feeding and sensing mechanism is conveniently mounted on a frame 40 that may support an electric motor 41 which, through a belt 42, a worm 43, and worm gear 44, drives the main shaft 45 of the machine.

The cards to be sensed, after having been arranged into groups, are stacked in a hopper 50 shown at the left of Figs. 2 and 3. Horizontally slidable below the hopper 50 is a picker plate 51 which is provided with an upwardly projecting shoulder 52 of just sufficient height to engage the edge of the lowest card in the hopper. For the purpose of reciprocating the picker plate 51, it is link-connected to the upper end of a lever 53 which is pivotally supported from the frame 40 of the machine. The lower end of the lever 53 is slotted for the reception of a pin 54 carried by a rod 55 which is horizontally reciprocable in bearings 56. The rod 55 is provided at its inner end with a cam roller which engages a feed cam 58 carried by the main shaft 45. Normally, the roller 57 is held in engagement with the cam 58 by means of a compression spring 59 which tends to force the rod 55 inward.

In the operation of the machine, the cam 58 revolves and causes reciprocation of the rod 55 and picker plate 51. At each reciprocation of the picker plate, the lowest card in the hopper 50 will be forced outward far enough to enter between the first pair of feed rolls 60 and 61. There are a plurality of pairs of such feed rolls, and they extend in a horizontal series across the machine to carry the cards from the hopper 50 to a second or discharge hopper 62. The lower feed rolls 60 are all rigid respectively with gears 63 which are connected by idler gears 64 so that all the rolls 60 revolve in the same direction. One of the gears 63 is adapted to be driven from the main shaft 45 as by means of the gears 65 and 66. Each of the upper feed rolls 61 is spring-pressed downward into engagement with its associated lower roll 60 in order that it may rotate therewith.

The cards while being fed successively from the hopper 50 to the discharge hopper 62 pass across a sensing plate 70 below which is mounted a pin box 71 vertically reciprocable in guides 72. The pin box may be reciprocated by means of a cam 72' carried on the main shaft 45. The pin box carries a plurality of upwardly spring-pressed pins 73 which are adapted to pass through correspondingly located holes in the sensing plate and are arranged in columns corresponding to the arrangement of holes in the cards which are to be sensed. As shown, each column comprises ten sensing pins. Mounted on the pin box 71 is a card stop 74 which reciprocates in close proximity to the discharge side of the sensing plate 70. The card stop 74 extends upward beyond the upper ends of the pins 73 in order that it may engage and definitely locate on the sensing plate the card to be sensed before such card is engaged by the sensing pins 73. When a card is stopped on the sensing plate by the stop 74, the lower feed rolls 60 which engage such card slip on the face of the card and do not operate to move the card off the plate until after the card stop 74 has been retracted in the downward movement of the pin box.

Each of the pins 73 is spring-pressed upward by means of a coil spring 75. The upward movement of each pin 73 under the influence of its associated spring 75 is limited as by means of a collar 76 adapted to engage the top of the pin box.

Mounted above the sensing plate 70 is a block of insulating material 80 in the lower face of which are arranged a plurality of contacts 81 disposed similarly to the sensing pins 73.

When the pin box 71 is moved upwardly by the cam 72', the sensing pins 73 engage the card which is then on the sensing plate 70, and those pins which find holes in the card pass through such holes and make electrical contact with the corresponding contacts 81. Preferably, the contacts so made do not immediately complete electrical circuits but merely make possible the later completion of circuits which control the operation of the adding machine by energizing various control magnets.

In order that any column of contacts 81 may be arranged to control any column of adding machine keys 20, the contacts 81 are not directly connected to the key-actuating solenoids 32 (Fig. 13) but are connected to gang jacks 82. Each of the gang jacks 82 comprises nine individual jacks connected respectively to nine of the contacts 81 in one of the columns of contacts. The zero contact 81 is not connected to any contact 82 as there is no zero key to be depressed on the adding machine. The zero contact 81, however, is connected to one of the electromagnets 91 for control purposes as described elsewhere. To co-operate with the gang jacks 82 there are gang plugs 83, each of which comprises nine individual plugs connected respectively to the windings of the solenoids 32 in one column of such solenoids. Any one of the gang plugs 83 can be inserted in any of the gang jacks 82, and thus any column of contacts 81 can be connected to any column of amount-key setting solenoids 32.

As the machine operates and cards are passed successively across the sensing plate 70 and are sensed, certain of the pins 73 pass through holes in each card corresponding to the item of such card which it is desired to record and to add into the adding machine. After contact has been made between certain of the pins 73 and their associated contacts 81, circuits are completed by means which will be described hereinafter, such circuits effecting the depression of amount-keys corresponding to the item designated by the arrangement of item-designating holes in the card then on the sensing plate. Following the depression of the amount-keys, the handle key 26 is depressed by means which will be described in detail later, and this depression of the handle key effects the recording of the item on the adding machine tape and the adding of the item into the upper adding machine accumulators. This operation is repeated at each cycle of the feeding and sensing mechanism during which cards having the same group-designation are fed across the sensing plate. When a card of a new group comes on the plate, it is usually desirable to interrupt the card feed and to cause the adding machine to print a total or to perform some other operation different from that which it performs as long as the cards passing across the sensing plate are all of the same group.

To detect the presence on the sensing plate of a card having a new group designation, to interrupt the card feed, and to cause the desired operation of the adding machine, selectors which have been described in Patent 1,208,051 may be employed. The present machine employs a plurality of these selectors, there being one selector for each column of holes in the punched cards which is apt to be used in group designation. These selectors are conveniently mounted on the under side of the frame 40 as shown in Fig. 3.

The construction of the selector unit is shown in detail in Figs. 8, 9, and 10. Each unit comprises a base 90 on which is mounted a series of electro-magnets 91 corresponding in number to the number of pins 73 in each column of pins in the pin box 71. As shown in Fig. 13, each selector unit includes ten of the magnets 91. Mounted above the base 90, as by being pivotally supported from standards 90', and extending longitudinally thereof is a rod 92 from which are supported armatures 93 for the various magnets 91, such armatures being separately rotatable on the rod 92. Preferably, each of the armatures 93 is mounted on a block 94 of insulating material, each of such blocks being rotatable on the rod 92. At its rear upper corner each of the blocks 94 is notched for the reception of a bar 95 which extends through the notches in all the blocks 94 and at its ends is mounted in arms 96 which are rigidly attached to the rod 92. On each of the blocks of insulating material 94 there is mounted a contact finger 97 which forms an electrical contact with the bar 95 when such bar is seated in the notch of the block 94.

When any one of the armatures is drawn downward by reason of the energization of its associated magnet 91, the rod 95 is moved upwardly out of contact with all the contact fingers 97 except that contact finger mounted on the block 94 which raised the bar 95. To prevent accidental lowering of any armature 93 which is associated with an unenergized magnet and to tend to retain in depressed position any armature which has been drawn downward by its associated magnet, each armature, at its free end, engages a spring 98 of the form shown in Fig. 9. Each of the springs 98 may be adjusted by means of an adjusting screw 99.

For the purpose of re-setting the selector unit, there is provided a re-setting magnet 101 associated with which is an armature 102 rigid with the arm 96 and rod 92. When the re-setting magnet 101 is energized, the armature 102 will be drawn to the right to the position shown in Fig. 10 to cause a counter-clockwise rotation of the rod 92, lowering of the bar 95 to the position shown, and raising of any armature 93 which has previously been depressed so as to place it in the position of Fig. 9.

As the machine is operated and the cards are successively fed across the sensing plate and sensed, the selector units, by a process which will be described in detail later, detect any difference in the group-denoting characteristics of the first card of a new group which arrives on the sensing plate. The change in group designation thus detected is made to cause an interruption in the card feed and to cause the adding machine to be operated to print a total, to clear one set of accumulators, and to add into the other set of accumulators the total printed.

To interrupt the card feed when the first card of a new group is sensed on the plate 70, there is provided a solenoid 105 having a coil 106 which is moved upward when the solenoid is energized to engage a notch 107 in the rod 55 and thus to hold such rod in retracted position with the cam roller 57 out of engagement with the feed cam 58. This latching in retracted position of the rod 55 permits the feed cam to rotate without causing the feeding of any cards from the hopper 50.

The first card of a new group which causes the interruption of the card feed contains items which are to be added into the adding machine after the total is printed, and it is therefore necessary that this card be retained on the sensing plate until after the total in the adding machine has been printed. To accomplish this result, there is mounted above the sensing plate 70 and substantially in alinement with the card stop 74 an auxiliary card stop which may conveniently take the form of one or more pins 110 operatively connected to the movable core of a solenoid 111. One or more springs 112 are provided for normally holding the pins in raised position so that they lie wholly above the plane of the cards passing across the sensing plate. Upon energization of the solenoid 111 the pins 110 are lowered sufficiently to prevent the discharge of the card then on the sensing plate. As the pins 110 must be lowered while the stop 74 is in a raised position, the stop 74 is provided with notches 74a (Fig. 14) which are in alinement with the pins.

The cessation of the card feed which is produced when the first card of a new group enters on the plate 70 may continue for any desired number of revolutions of the main shaft 45 but it has been found convenient and sufficient to provide for the interruption of the card feed for three revolutions of the main shaft. For this purpose, there is provided mating 1–3 gears 115 and 116, the smaller of which (the gear 115) may be made to rotate at the same speed as does the main shaft and is conveniently rotatably mounted thereon as is clear from Fig. 6. Any convenient clutching mechanism may be employed to clutch the gear 115 to the shaft 45. The gear 116 is rigid with a shaft 117 which carries a commutator 118. The commutator 118 controls the operations which occur while the card feed is interrupted and causes a resumption of the card feed upon the completion of such operations.

One form of clutch which may be employed to clutch the gear 115 to the shaft 45 is illustrated in Fig. 6. The outer face of the hub of the gear 115 is provided with one or more clutch teeth 120 adapted to engage corresponding teeth in the adjacent face of a clutch member 121 which rotates with the shaft 45 and is slidable therealong so that it may be engaged with and disengaged from the hub gear 115. The clutch member 121 is provided with a circumferential groove 122 which receives one end of a pivotally supported lever 123 the other end of which is adapted to enter a notch in a disc 124 rotatable with the shaft 117 and commutator 118. When the clutch member 121 is disengaged from the hub of the gear 115, the lever 123 is received in the notch in the disc 124, and the commutator 118 and gears 115 and 116 are prevented from rotating. When the clutch member 121 is moved into engagement with the hub of the gear 115, the lever 123 leaves the notch in the gear 124 and permits the commutator 118 to be driven through the medium of the gears 115 and 116. The clutch member 121 remains in engagement with the hub of the gear 115 until the commutator 118 and the disc 124 have made one complete revolution, at the completion of which the lever 123 is permitted to move into the notch of the disc 124 thus causing disengagement of the clutch member 121 from the hub of the gear 115 and stopping the rotation of the commutator 118.

To operate the clutch member 121 there is provided a solenoid 125 which is stationarily mounted adjacent the end of the shaft 45, such shaft-end extending into and part way through such solenoid. The clutch member 121 is provided with a hub 121' which also extends into the axial hole in the solenoid 125. The hub 121' extends beyond the end of the shaft 45 and has rigidly mounted within it beyond such shaft-end a core 126 between which and the end of the shaft 45 there acts a spring 127 tending to separate the clutch member 121 from the gear 115.

When the solenoid 125 is de-energized, the spring 127 serves to hold the gear 115 and clutch member 121 disengaged so that the shaft 45 is free to rotate relative to the gear 115 which is loose on the shaft. Upon energization of the solenoid, the core 126 is drawn toward the end of the shaft and carries the clutch member 121 which is keyed to shaft 45 at 121a, with it to cause the gear 115 to be clutched to the shaft 45.

In addition to the totaling commutator 118, there is provided a second commutator 130 which rotates at the same rate as the main shaft 45, and is conveniently mounted on such main shaft as is clear from Figs. 3 and 11. Co-operating with the commutator 130 is a movable brush 131 which may be pivotally mounted in a suitable support 132 and spring-pressed into engagement with the commutator 130 by means of a spring 133. The brush 131 is so arranged as to form an armature for an electro-magnet 135 which when energized serves to withdraw the brush from contact with the commutator 130. To prevent arcing when the brush 131 is separated from the commutator 130, there is provided a blow-out magnet 137 the core of which is provided with extensions 138 and 139 to form a magnetic field across the point of separation of the brush and the commutator.

The general arrangement of the electrical connections is shown in Fig. 13 in which the various parts of my machine are illustrated somewhat diagrammatically. One side of the supply circuit, here shown as the positive side, is connected to brushes 145 and 146 which contact respectively with the commutators 130 and 118. The brush 131 which co-operates with the commutator 130 is connected through the blow-out magnet 137 with all the sensing pins 73 in the pin box 71. As has been above described, the contacts 81 are connected through the jacks 82 and plugs 83 with the windings of the amount-key setting solenoids 32. The other ends of the windings of the solenoids 32 are connected to a common bus wire 147 which leads to one individual plug of a gang plug 148. Also connected to the bus wire 147 is one end of the windings of each of the solenoids 35, 36, and 37 which operate respectively the error key, the total transfer key, and the handle key of the adding mechanism. The other ends of the windings of the three last-mentioned solenoids are connected respectively to individual plugs in the gang plug 148. The gang plug 148 is adapted to be received in a gang jack 149 in which the individual jack (the lowest one of the four) which receives the plug connected to the bus wire 147, is connected to the negative side of the supply circuit.

The contacts 81 making up one column of contacts are connected respectively with one end of each of the windings of the magnets 91 in one of the selector units. The other end of the winding of each selector magnet is connected to its associated contact armature 93. The bar 95 of each selector unit is connected to one contact 150 of a relay 151 associated with such selector unit and having a winding one end of which is connected to the contact 150 and the other end of which is connected to the negative side of the supply circuit. The armatures 152 of the relays 151 are all connected to a brush 153 which co-operates with the commutator 130. The relay contacts 154, which are those contacts engaged by their respective armatures when the associated relays are de-energized, are connected in common by a wire 155 which leads to a brush 156 associated with the total commutator 118. The clutch magnet 125 is connected between the wire 155 and the negative side of the supply circuit. Also connected between the wire 155 and the negative side of the supply circuit, through the plug and jack 148 and 149 is the error key magnet 35.

The selector reset magnets 101 are all connected in multiple between the negative side of the supply circuit and the brush 157 connected to one end of the commutator 118. Also connected between the brush 157 and the negative side of the supply circuit is the solenoid 36 which operates the total-transfer key. The brush-lifting magnet 135, the feed-stop magnet 105 and the card-stop magnet 111 are connected in multiple between the negative side of the supply circuit and the brush 158 which co-operates with the totaling commutator 118.

Associated with the commutator 130 is a brush 159 which is connected through the plug 148 and jack 149 with the solenoid 37 which operates the handle-key of the adding machine.

Each selector unit may be arranged to be connected to any column of contacts 81 by means of the plugs and jacks shown in Patent 1,978,919, previously mentioned; or means may be provided, as shown in this application, for rendering any desired selector unit or units inoperative to detect changes in the designating characteristics of the cards. The ability of the selector unit to detect card changes depends upon the separation of the bar 95 from all the contacts 97 whose associated armatures have not been drawn downward. Means may be provided for preventing the separation of the bar 95 from any of the contacts 97 in any selector unit and such selector unit thus rendered ineffective to detect changes in the cards. To this end, each selector unit is provided with some means which will prevent rotation of the rod 92, thus holding down the bar 95 and preventing downward movement of any of the armatures 93. A pin or plug 160 (Figs. 8 and 10) may be provided which when passed through a suitable hole in one of the standards 90' which support the rod 92 will engage the armature 102 as shown in dotted lines in Fig. 8. Armature 102 is fixed to arm 96 which is fixed on shaft 92. This will prevent clockwise rotation of the rod 92.

Another means of accomplishing this result is to provide switch plugs as indicated at "A" Fig. 13. The withdrawal of any such plug, and hence the opening of the circuit from the contact 154 of its corresponding selector unit, will make such unit incapable of initiating a total taking cycle.

The operation of the machine is as follows:

It is assumed that the cards to be sensed are arranged in groups in the hopper 50 with all the cards of one group together. At the start of a run, the bar 95 of each selector unit is in its lower position and all the armatures 93 are raised. The reset magnets 101 are de-energized, as are also the relay magnets 151. The armatures 152 of the relays are all in contact with the contacts 154. The clutch magnet 125 is de-energized and the shaft 45 is therefore free to rotate without rotating the gear 115 which is loose on said shaft. The feed-stop magnet 105 and the card-stop magnet 111 are de-energized so as not to interfere with the feeding of cards across the sensing plate. The brush lifting magnet 135 is de-energized and the brush 131 is in contact with the commutator 130.

In setting up the machine, the plugs 83 are so arranged in the jacks 82 that the items on the cards will be recorded in the desired location on the adding machine tape. Those selector units which are connected to columns of contacts corresponding to columns of holes in the punched card which are group-designating columns are made ready for operation by the removal of the plugs 160 or insertion of plugs A, while those selector units which are associated with columns of contacts corresponding to columns of holes in the punched-card which do not designate group are rendered inoperative by the insertion of the plugs 160, or removal of plugs "A".

With the machine set up in the manner described, it is started, and cards previously sorted into groups are fed successively across the sensing plate. As each card passes across the sensing plate, the pin box rises, the card stop 74 locates the card definitely on the plate, and the pin box, continuing upward, permits those sensing pins which find holes in the card to pass through the card into contact with the corresponding contacts 81. As has been stated above, no circuits are completed when the pins engage the contacts 81. The pin box remains raised for an interval and engagement of the pins 73 and contacts 81 is maintained until the commutator 130 engages the brush 131. This engagement completes a circuit from the positive side of the line through the brush 145 to commutator 130, brush 131, blow-out magnet 137, pins 73, contacts 81, jacks 82, plugs 83 and amount-key setting solenoids 32 to the negative side of the source. The resultant energization of the amount-key solenoids 32 depresses such keys and makes the adding machine ready for the recording and accumulating operation which follows immediately. Only part of the current flowing through the pins 73 and contacts 81 reaches the solenoids, as part of it passes through that selector magnet 91 in each selector unit which corresponds to that contact in the column of contacts which is associated with that selector unit. In those selector units which have not been rendered inoperative by the use of the pins 160 or withdrawal of plugs at A the energization of one of the selector magnets 91 draws downward the associated armature 93 and elevates the bar 95 so that its contact is broken with all the contact fingers 97 except that one which is associated with the armature whose depression caused the bar 95 to be raised. The current which causes this energization of one of the magnets 91 in each selector unit, after leaving the winding of the magnet 91, flows through the contact finger 97, bar 95, and relay 151 to the negative side of the supply circuit. The resultant energization of the relays 151 causes their armatures 152 to be drawn against their respective contacts 150. The relay magnets 151 remain energized until the commutator 130 engages the brush 153, and this engagement completes a holding circuit from the positive side of the supply circuit, through the brush 145 to commutator 130, brush 153, armatures 152, contacts 150, and relays 151 to the negative side of the supply circuit. Completion of the holding circuit, which is in parallel with the circuits through the pins and selector magnets, is made so that the armatures 152 will remain against the contacts 150 after the circuit through pins 73 is opened and until after the brush 153 has left the commutator 130.

At some time after the amount-keys have been set by the energization of the solenoids 32, the commutator 130 comes into engagement with the brush 159 to complete a circuit from the positive side of the source through the brush 145 to commutator 130 and brush 159 and handle key magnet 37 to the negative side of the source. The energization of the handle key magnet depresses the handle key and causes the adding machine to record the item denoted on the punched card then on the sensing plate and causes such item to be added into one set of the accumulators of the adding machine. At some time after the commutator segment 130 leaves the brush 131, the pin box descends, the card which has just been sensed passes off the sensing plate, and the next card takes its place.

Those selector units which are rendered operative by the removal of the pins 160 and the insertion of plugs at A are now in a different condition from that which existed before the first card was sensed. Whereas before, the bar 95 in each controlling selector unit was in its lower position and in contact with all the fingers 97, now the bar 95 in each controlling selector unit is raised and is in contact with only one of the fingers 97. The contact finger 97 which still engages the bar 95 corresponds to that contact 81, in the column of contacts associated with that selector unit, which was opposite a hole in the card just previously sensed. The relay 151 of each selector unit was de-energized when the commutator 130 moved out of contact from the brush 153; and as a result, the armatures 152 are all again in engagement with the contacts 154.

When the pin box rises to sense the second card, circuits are completed as before through the amount-key setting solenoids 32, and the corresponding amount-keys are depressed. If the second card has the same group-designating characteristics as had the first, the circuits through the controlling selector units are completed as before; for in each selector unit, there is one contact finger 97 still in engagement with the bar 95, and this contact finger corresponds to the contact 81 which was engaged by a sensing pin 73 while the first card was sensed, and as the second card is of the same group as of the first, there is no difference in the location of holes in the group-designating columns of the card. The completion of the circuits through the selector units operates the relays 151 as before, and when the brush 159 is engaged by the commutator 130 the amount just set in the adding machine by the depression of the amount-keys will be recorded and added into the accumulators of the adding machine.

This cycle of operations is repeated as long as the cards being sensed belong to the same group. The first card of a new group will have in one of the group-designating columns a hole which is differently located from the hole in the corresponding column of previous cards. As a result, the sensing pin which passes through this differently located hole will engage a contact 81 corresponding to one of those contact fingers 97 which is not in contact with the bar 95. There may be a differently located hole in only one column, or the holes in other group-designating columns may be differently located. In any event, upon a change in group-designation, there will be at least one selector unit in which no circuit is completed to the bar 95. Thus, the relay 151 associated with that selector unit will not become energized, and its armature 152 will remain in engagement with the contact 154.

When the commutator 130 engages the brush 153, a circuit will be completed from the positive side of the supply line through the brush 145 to commutator 130, brush 153, the armature 152 of that relay 151 which was not energized upon completion of the pin circuit, the contact 154 of such relay, and the clutch magnet 125 to the negative side of the supply circuit. The current flowing through this circuit branches before passing through the clutch magnet 125, and part of the current flows through the error key magnet 35 to the negative side of the supply line. Energization of the error key magnet does not immediately raise those amount-keys which have just been depressed as such keys are still held in lowered position by their associated solenoids 32. If any plug A has been removed no circuit can be completed through the associated relay armature 152 and contact 154, thus rendering any change in the corresponding selector unit inoperative to effect energization of the clutch magnet 125 or the error key magnet 35.

The energization of the clutch magnet 125 which occurred when the commutator 130 engaged the brush 153, causes the gear 115 to be clutched to the shaft 45 and initiates rotation of the totaling commutator.

Following this, the totaling commutator 118 engages the brush 158 to complete a circuit from the positive side of the supply source through the brush 146, commutator 118, brush 158, and thence in parallel through the card-feed-stop magnet 105, the card-retaining magnet 111, and the brush lifting magnet 135, to the negative side of the supply circuit. As has been above described, the card-feed-stop magnet 105, when energized, interrupts reciprocation of the rod 55 and causes the stopping of the card feed. Energization of the card-retaining magnet 111 causes depression of the pins 110 and retains on the sensing plate the first card of the new group. The lifting of the brush 131 from the commutator 130 interrupts the flow of current through the key actuating solenoids thus permitting descent of the error key and the raising of the amount keys previously set.

After the error key has been depressed, and after the brush 131 has been raised the commutator 130 engages the brush 159 to cause depression of the handle key as has been before described. This depression of the handle key produces a blank or spacing cycle of the adding machine, as the amount-keys previously depressed have been raised by the actuation of the error key. This blank cycle of the adding machine produces a spacing of the adding machine tape and provides for the return to normal zero position of any adding machine sectors which have "carried" in the previous item-recording cycle.

Following the interruption of the card feed, the totaling commutator 118 engages the brush 156 to complete a circuit through the clutch magnet 125, such circuit remaining closed throughout nearly all the rotation of the commutator 118.

All the operations just described have occurred during the first third of the rotation of the totaling commutator 118. During the second third of the rotation of the commutator 118, the circuits already closed by such commutator remain closed, and in addition there is completed a circuit from the positive side of the supply source, through brush 146 the commutator 118, brush 157, and thence in parallel through all the reset magnets 101 and total key magnet 36 to the negative side of the supply circuit. The reset magnets 101 reset their respective selectors by drawing the bars 95 downward and moving to raised position all the armatures 93. The completion of a circuit through the total transfer key magnet 36 depresses the total transfer key so that later, when the commutator 130 engages the brush 159 to cause depression of the handle key, the total in one set of accumulators in the adding machine will be printed and transferred to the other set, and the first set of accumulators cleared.

The commutator 118 leaves the brush 157 before the next actuation of the handle key, and when, during the last third of the rotation of the commutator 118, the commutator 130 engages the brush 159, a spacing cycle of the adding machine will be produced to provide a spacing between the group total just printed and the first item of the next group of cards.

In the above described operations all of the accumulating has been done on what is commonly known as the "upper" accumulators, and when the total has been taken what is commonly known as the "transfer total" key has been depressed, so that the total of the items which have been accumulated in the upper accumulators have been printed and transferred to another set of accumulators ordinarily known as the "lower" set, before the upper accumulators are cleared.

If, as is frequently the case, after a certain number of groups of cards has been run through the machine, and the individual totals of these groups taken, it is desired to obtain the grand total, that is, the total of all of the total items which have been previously printed, one or more blank cards are placed above the group of cards following which the grand total is desired.

After the last totaling operation this blank card will be fed on to the pin plate 70, at which time the machine must be stopped manually. This may be done by shutting off the current to the driving motor.

With the machine in this stopped position the "accumulator" lever 27, which heretofore has been in the "upper" position, so that all accumulating has been done and totals printed from the upper accumulators, is moved to the "lower" position, so that a total can be printed from the lower set of accumulators and these accumulators cleared. With the lever in this position the total key 23, that is, the total key which controls the lower set of accumulators, and which is not equipped with an operating solenoid, is depressed by hand and then the handle key depressed by hand which causes the adding machine to print a grand total and results in the clearing of the lower set of accumulators. Both sets of accumulators are now clear as the upper set was cleared at the time at which the total of the last group of cards was printed. The "counter" lever can now be moved back to the "upper" position, and the machine is ready for further operation as previously described.

What is claimed is:

A machine for operating an accounting machine of the class described having an adding machine provided with accumulators, amount setting keys for causing accumulation in one of the accumulators, and a transfer control member for causing the transfer of a total from the accumulator receiving entries under control of the keys to another accumulator, comprising record sensing means, group control mechanism controlled by a part of the sensing means, resetting devices for said group control mechanism, means controlled by another part of said sensing means for controlling said amount setting keys, and means including a total taking commutator device controlled by said group control mechanism for effecting concurrent operation of said transfer member and said resetting devices.

WILMINGTON TRUST COMPANY,
By ELWYN EVANS,
    *Vice-President,*
ELIZABETH W. TRIPP,
*Executors of the Estate of Charles A. Tripp, Deceased.*